United States Patent Office 3,451,890
Patented June 24, 1969

3,451,890
ROSIN SIZE COMPOSITIONS
Joseph H. Stump, Jr., Pensacola, Fla., assignor to Tenneco Chemicals, Inc., a corporation of Delaware
No Drawing. Continuation-in-part of application Ser. No. 521,510, Jan. 19, 1966. This application Mar. 11, 1966, Ser. No. 533,409
Int. Cl. D21h 3/40; D21d 3/00
U.S. Cl. 162—168          19 Claims

ABSTRACT OF THE DISCLOSURE

A paper size composition comprises an alkali metal salt of rosin and about 0.1 percent to 15 percent, based on the weight of the rosin salt, of a polymeric polycarboxylic acid salt having repeating units of the structure.

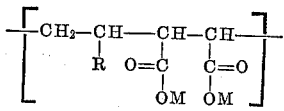

wherein R represents hydrogen, a lower alkyl group, a lower alkoxy group, or an aryl group and each M represents an alkali metal or ammonium. Illustrative of the useful polymeric polycarboxylic acid salts are the salts of methyl vinyl ether-maleic anhydride copolymers, ethylene-maleic anhydride copolymers, and styrene-maleic anhydride copolymers.

---

This is a continuation-in-part of copending application Ser. No. 521,510 now abandoned, which was filed on Jan. 19, 1966.

This invention relates to novel rosin size compositions. It further relates to the use of these compositions for sizing paper and other water-laid cellulose webs and to paper so sized.

It is well known that paper of improved resistance to penetration by water and by ink results when the cellulosic fibers are treated with resin size prior to the sheeting step. Further improvements have been obtained in the properties of the sized paper by reacting the resin with a small amount of an alpha, beta-unsaturated dicarboxylic acid or anhydride and/or with formaldehyde or other fortifying agents before adding it to the fiber suspension.

It has now been found that the effectiveness of the previously-known rosin size compositions can be greatly improved by incorporating in them a salt of a polymeric carboxylic acid.

The polymeric acid salts that can be used in the practice of this invention have repeating units that have the structure

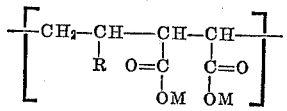

wherein R represents hydrogen, an alkyl group having from 1 to 4 carbon atoms, an alkoxy group having from 1 to 4 carbon atoms, or an aryl group and each M represents an alkyli metal or ammonium.

These polymeric acid salts may be prepared by reacting a copolymer having repeating units that have the structure

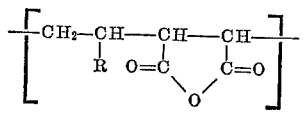

or

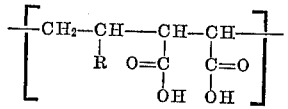

wherein R has the aforementioned significance with an alkali metal or ammonium hydroxide or carbonate.

The copolymers from which these salts are prepared are known materials which may be obtained by copolymerizing maleic anhydride or fumaric acid with a comonomer by methods that are well known to those skilled in the art, for example, by methods described in the Hanford patents, U.S. 2,378,629 and U.S. 2,396,785. These methods involve reacting a monomer, such as ethylene, propylene, 1- or 2-hexene, methyl vinyl ether, propyl vinyl ether, styrene, methylstyrene, or chlorostyrene, or a mixture of these monomers with maleic anhydride or fumaric acid in the presence of benzoyl peroxide or another peroxide catalyst in a hydrocarbon solvent in which the monomers are soluble and the copolymer is insoluble. Suitable solvents include benzene, toluene, xylene, hexene, ethylene dichloride, and the like. The copolymers contain substantially equimolar quantities of the acid residue and the comonomer residue. Their molecular weights and other properties may be regulated by proper choice of such variables as catalyst, catalyst concentration, reaction temperature, and the like. They may have linear or cross-linked polymer chains. The copolymers of particular value in the practice of this invention are those prepared from maleic anhydride and either ethylene, methyl vinyl ether, or styrene which have specific viscosities in the range of about 0.1 to 3.5, as determined on a 1% solution of the copolymer in methyl ethyl ketone at 25° C.

Only a small amount of the polymeric polycarboxylic acid salt need be present in the rosin size to improve the properties of the paper treated with the size. In most cases about 0.1 percent to 15 percent of the polymeric polycarboxylic acid salt based on the weight of the rosin salt is used in the size, with particularly advantageous results being obtained when 0.5 percent to 10 percent of the polymeric polycarboxylic acid salt is used.

The rosin size compositions of this invention may be prepared by any suitable and convenient procedure. For example, dilute solutions containing the salt of the polymeric polycarboxylic acid and the rosin salt may be mixed to form a solution that may be used as such in the sizing of paper or that may be evaporated to dryness to form a dry rosin size composition. Alternatively, mixtures of rosin and the polymeric polycarboxylic acid compound may be neutralized with an alkali metal hydroxide or carbonate to form the novel size compositions. If desired, the rosin salt and the polymeric polycarboxylic acid salt may be added separately to the pulp at the time of sizing, but this has been found to be less efficacious.

The rosins that may be used in the novel sizes of this inveniton include wood rosin, gum rosin, tall oil rosin, and the like. They also include specially refined and treated rosins, such as heat-treated rosin, dispropotrionated rosin, hydrogenated rosin, dehydrogenated rosin, and polymerized rosin. Also included in the term "rosin" as used herein and in the claims are modified rosins obtained by reacting any of the aforementioned rosin materials with a modifying agent, such as formaldehyde, acrylic acid, maleic anhydride, fumaric acid, itaconic acid, citraconic acid, and the like. Of particular value as components of the novel rosin size compositions are the reaction product of rosin with about 0.5 percent to 15 percent of its weight of formaldehyde or paraformaldehyde; the reaction product of rosin with about 1 percent to 10 percent of its weight of fumaric acid or maleic anhydride; and the reaction product of rosin with about 0.5 percent to 10 percent of its weight of formaldehyde and about 2 percent to 6 percent of its weight of fumaric acid or maleic anhydride. It is generally preferred that the rosin salt component of the size contain up to about 30 percent, based on the weight of the acids originally present in the rosin, of free rosin acids.

The sized paper of this invention is made by the beater addition process in which the rosin size composition or its components are added to the aqueous suspension of the cellulosic paper-making fibers before sheeting. The rosin size composition is preferably added in the form of a dilute aqueous solution that contains both a rosin salt and a salt of one of the aforementioned polymeric polycarboxylic acids. It may be incorporated into the fiber suspension at any convenient point ahead of the wire, a few minutes being allowed during which the size is substantially adsorbed by the fibers. The size is then precipitated onto the fibers by the addition of alum or another mordant, hte fibers sheeted to form a web, and the web dried to form paper. The amount of size used may be varied widely depending upon the results desired, but in general the amount of size is between about 0.25 percent and 5 percent and preferably between 1 percent and 4 percent based on the dry weight of the fibers. The amount of alum added may be from 0.5 percent to 5 percent and is usually 1 percent to 2 percent of the weight of the dry fibers.

The invention is further illustrated by the examples that follow. In these examples all parts and percentages are parts by weight and percentages by weight.

EXAMPLE 1

A 1 percent aqueous solution of the sodium salt of a methyl vinyl ether-maleic anhydride copolymer that had a specific viscosity of 0.01–0.05 (Gantrez AN–119) was blended with the sodium salt of tall oil rosin that had been modified by reaction with 3 percent of its weight of formaldehyde to form a rosin size composition that contained 3 percent of the copolymer based on the weight of the formaldehyde-modified rosin salt.

Paper handsheets sized with this rosin size composition or with the sodium salt of the aforementioned formaldehyde-modified tall oil rosin were prepared and evaluated by standard laboratory procedures. Semi-bleached kraft pulp was beaten to a Canadian Standard Freeness of 600 at 2.5 percent consistency with water adjusted to pH 4.5 with sulfuric acid. To this pulp suspension was added in increments as rosin size composition and papermaker's alum to provide the desired levels of size and alum. The final pulp was adjusted to pH 4.5 with sulfuric acid. The handsheets were made in a Noble and Wood Handsheet Machine using recycle water at pH 4.5 for dilution. The sheets were pressed and dried and then conditioned at 90° F. and 40% relative humidity for at least two hours. The handsheets were tested for water absorption by the Cobb Test, TAPPI Method T 444 M–60, and for ink penetration by the standard Penescope and Fotosize tests.

The following results were obtained:

| Ex. No. | Percent copolymer in size | Fotosize (sec.) | Penescope (sec.) | Cobb (g./100 cm².) |
|---|---|---|---|---|
| 1A | 3 | 124 | 154 | 0.2425 |
| 1B | 0 | 42 | 82 | 0.2497 |

EXAMPLE 2

Samples of high molecular weight and low molecular weight methyl vinyl ether-maleic anhydride copolymers were neutralized with sodium hydroxide. One percent aqueous solutions of the resulting sodium salts were blended with 1 percent solutions of the sodium salt of tall oil rosin that had been modified by reaction with 3 percent by weight of formaldehyde and 4 percent by weight of fumaric acid to form rosin size compositions that contained varying amounts of the copolymer. Paper handsheets were prepared from bleached pulp and these size compositions were evaluated by the procedures described in Example 1. The results obtained are summarized in the table that follows.

| Ex. No. | | Percent copolymer in size | Fotosize (sec.) | Penescope (sec.) | Cobb (g./100 cm².) |
|---|---|---|---|---|---|
| 2A | Methyl vinyl ethermaleic anhydride intrinsic viscosity, 0.1–0.5. | 1.0 | 225 | 257 | 0.2500 |
| 2B | ....do.... | 5.0 | 226 | 285 | 0.2512 |
| 2C | Methyl vinyl ethermaleic anhydride intrinsic viscosity, 2.6–3.5. | 1.0 | 187 | 258 | 0.2441 |
| 2D | ....do.... | 5.0 | 167 | 245 | 0.2552 |
| 2E | None | | 157 | 230 | 0.2570 |

EXAMPLE 3

A one percent solution of the ammonium salt of a methyl vinyl ether-maleic anhydride copolymer that had a specific viscosity of 0.01–0.05 was blended with the sodium salt of tall oil rosin that had been modified by reaction with 3 percent by weight of formaldehyde and 4 percent of fumaric acid to form rosin size compositions that contained varying amounts of the copolymer. Paper handsheets were prepared from bleached pulp and these size compositions and evaluated by the procedures described in Example 1. The results obtained are summarized in the table that follows:

| Ex. No. | Percent copolymer in size | Fotosize (sec.) | Penescope (sec.) | Cobb (g./100 cm².) |
|---|---|---|---|---|
| 3A | 7 | 259 | 307 | 0.2388 |
| 3B | 1 | 242 | 275 | 0.2453 |
| 3C | 0 | 209 | 255 | 0.2563 |

EXAMPLE 4

Samples of ethylene-maleic anhydride copolymers of various molecular weights were neutralized with sodium hydroxide. One percent aqueous solutions of the resulting sodium salts were blended with 1 percent aqueous solutions of the sodium salt of tall oil rosin that had been modified by reaction first with two percent by weight of formaldehyde and then with six percent by weight of fumaric acid to form rosin size compositions that contained varying amounts of the copolymers. Paper handsheets were prepared from semi-bleached pulp and these size compositions and evaluated by the procedures described in Example 1. The results obtained are summarized in the table that follows.

| Ex. No. | Copolymer | Percent copolymer in size | Fotosize (sec.) | Penescope (sec.) | Cobb (g./100 cm.²) |
|---|---|---|---|---|---|
| 4A | Ethylene-maleic anhydride copolymer; viscosity of 2% solution, 2 cps. | 5 | 258 | 300 | 0.2383 |
| 4B | do | 1 | 260 | 308 | 0.2413 |
| 4C | Ethylene-maleic anhydride copolymer; viscosity of 2% solution, 5 cps. | 7 | 243 | 299 | 0.2468 |
| 4D | do | 1 | 241 | 259 | 0.2442 |
| 4E | Ethylene-maleic anhydride copolymer; viscosity of 2% solution, 960 cps. | 10 | 211 | 281 | 0.2478 |
| 4F | do | 1 | 272 | 273 | 0.2495 |
| 4G | None | | 209 | 250 | 0.2434 |

EXAMPLE 5

A one percent solution of the sodium salt of a cross-linked ethylene-maleic anhydride copolymer (viscosity of 2% solution—960 cps.) was blended with a 1 percent solution of a dark size that comprised either the sodium salt of tall oil pitch or the sodium salts of a mixture of 70 parts of tall oil pitch and 30 parts of B rosin. Paper handsheets were prepared and evaluated by the procedures described in Example 1. The results obtained are summarized in the table that follows:

| Ex. No. | Rosin size | Percent copolymer in size | Fotosize (sec.) | Penescope (sec.) | Cobb (g./100 cm.²) |
|---|---|---|---|---|---|
| 5A | Na salt of tall oil pitch. | 1 | 182 | 97 | 0.2860 |
| 5B | do | 0 | 177 | 69 | 0.2904 |
| 5C | Na salts of tall oil pitch and B rosin. | 1 | 728 | 558 | 0.2688 |
| 5D | do | 0 | 688 | 545 | 0.2733 |

EXAMPLE 6

A 1 percent aqueous solution of the sodium salt of a styrene-maleic anhydride copolymer that had a molecular weight of 400–600, an acid number of 390, and a melting range of 80° to 90° C. (SMA 4000–A) was blended with 1 percent solutions of the sodium salts of various types of rosin to form rosin size compositions that contained varying amounts of the copolymer. Paper handsheets were prepared from bleached pulp and these size compositions and evaluated by the procedures described in Example 1. The results obtained are summarized in the table that follows:

| Ex. No. | Type of rosin | Percent copolymer in size | Fotosize (sec.) |
|---|---|---|---|
| 6A | Heat-treated wood rosin | 10 | 161.8 |
| 6B | | 5 | 95.1 |
| 6C | | 3 | 74.6 |
| 6D | | 1 | 72.0 |
| 6E | | 0 | 64.1 |
| 6F | Gum rosin | 10 | 73.0 |
| 6G | | 5 | 72.5 |
| 6H | | 3 | 98.0 |
| 6I | | 1 | 87.5 |
| 6J | | 0 | 76.2 |
| 6K | Wood rosin modified with 5% fumaric acid. | 10 | 180 |
| 6L | | 5 | 103 |
| 6M | | 3 | 87 |
| 6N | | 1 | 99 |
| 6O | | 0 | 95 |
| 6P | Heat-treated wood rosin modified with 4% maleic anhydride. | 10 | 68 |
| 6Q | | 8 | 83 |
| 6R | | 6 | 80 |
| 6S | | 4 | 75 |
| 6T | | 0 | 66 |

From the data in Examples 1–6 it will be seen that in each case the incorporation of a salt of a polymeric polycarboxylic acid into a rosin size resulted in a substantial improvement in the properties of the paper to which the size was applied.

In addition to the rosin salt component and the polymeric polycarboxylic acid salt, the rosin size compositions of this invention may contain such other materials as starch, casein, clay, vinyl acetate resins, pitch, dispersants, and the like which are commonly used in size compositions.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A rosin size composition comprising (a) the sodium salt of rosin and (b) from about 0.1% to 15%, based on the weight of said rosin salt, of a polymeric polycarboxylic acid salt selected from the ground consisting of alkali metal and ammonium salts of methyl vinyl ether-maleic anhydride copolymers, ethylene-maleic anhydride copolymers, and styrene-maleic anhydride copolymers.

2. A rosin size composition according to claim 1 wherein the polymeric polycarboxylic acid salt is a salt of a methyl vinyl ether-maleic anhydride copolymer.

3. A rosin size composition according to claim 1 wherein the polymeric polycarboxylic acid salt is a salt of an ethylene-maleic anhydride copolymer.

4. A rosin size composition according to claim 1 wherein the polymeric polycarboxylic acid salt is a salt of a styrene-maleic anhydride copolymer.

5. A rosin size composition according to claim 1 which contains 0.5% to 10% based on the weight of the rosin salt of said polymeric polycarboxylic acid salt.

6. A rosin size composition according to claim 1 wherein the rosin employed is a fortified rosin that is the product of the reaction of rosin with about 0.5 percent to 15 percent of its weight of formaldehyde.

7. A rosin size composition according to claim 1 wherein the rosin employed is a fortified rosin that is the product of the reaction of rosin with about 0.5 percent to 10 percent of its weight of formaldehyde and about 2 percent to 6 percent of its weight of fumaric acid or maleic anhydride.

8. A process for the production of rosin size compositions based on the weight of the rosin, of a copolymer selected from the group consisting of methyl vinyl ether-maleic anhydride copolymers, ethylene-maleic anhydride copolymers, and styrene-maleic anhydride copolymers and neutralizing said mixture with a member selected from the group consisting of sodium hydroxide and sodium carbonate which comprises forming of mixture of rosin and 0.1% to 15%.

9. The process of claim 8 wherein the copolymer is a methyl vinyl ether-maleic anhydride copolymer.

10. The process of claim 8 wherein the copolymer is an ethylene-maleic anhydride copolymer.

11. The process of claim 8 wherein the copolymer is styrene-maleic anhydride copolymer.

12. Sized paper comprising a water-laid web of cellulosic fibers carrying alum-precipitated size in an amount in the range of about 0.25% to 5%, based on the weight of the dry fibers, said size comprising (a) the sodium salt of rosin and (b) from about 0.1% to 15%, based on the weight of said rosin size, of a polymeric polycarboxylic acid salt selected from the group consisting of alkali metal and ammonium salts of methyl vinyl ether-maleic anhydride copolymers, ethylene-maleic anhydride copolymers, and styrene-maleic anhydride copolymers.

13. Sized paper according to claim 12 wherein the polymeric polycarboxylic acid salt present in the size is a salt of an ethylene-maleic anhydride copolymer.

14. Sized paper according to claim 12 wherein the polymeric polycarboxylic acid salt present in the size is a salt of a methyl vinyl ether-maleic anhydride copolymer.

15. Sized paper according to claim 12 wherein the polymeric polycarboxylic acid salt present in the size is a salt of a styrene-maleic anhydride copolymer.

16. The process for the production of sized paper which comprises incorporating into an aqueous suspension of cellulosic fibers about 0.25% to 5% based on the weight of the dry fibers of a size comprising (a) the sodium salt of rosin and (b) from about 0.1% to 15% based on the weight of said rosin salt of a polymeric polycarboxylic acid salt selected from the group consisting of alkali metal and ammonium salts of methyl vinyl ether-maleic anhydride copolymers, ethylene-maleic anhydride copolymers, and styrene-maleic anhydride copolymers, precipitating said size on said fibers by the action of alum, sheeting said fibers to form a web, and drying said web.

17. The process of claim 16 wherein the size comprises (a) the sodium salt of rosin and (b) 0.5% to 10% based on the weight of said rosin salt, of the sodium salt of an ethylene-maleic anhydride copolymer.

18. The process of claim 16 wherein the size comprises (a) the sodium salt of rosin and (b) 0.5% to 10%, based on the weight of said rosin salt, of the sodium salt of a methyl vinyl ether-maleic anhydride copolymer.

19. The process of claim 16 wherein the size comprises (a) the sodium salt of rosin and (b) 0.5% to 10%, based on the weight of said rosin salt, of the sodium salt of a styrene-maleic anhydride copolymer.

References Cited

UNITED STATES PATENTS 2,676,121   4/1954   Chapman _____ 260—27

DONALD E. CZAJA, *Primary Examiner.*

WILLIAM E. PARKER, *Assistant Examiner.*

U.S. Cl. X.R.

162—169, 180; 260—27, 78.5

UNITED STATES PATENT OFFICE
CERTIFICATE OF CORRECTION

Patent No. 3,451,890     Dated June 24, 1969

Joseph H. Stump, Jr.

It is certified that error appears in the above-identified patent and that said Letters Patent are hereby corrected as shown below:

Column 6, line 23, "ground" should read --group--; Column 6, line 50, after "tions" insert --which comprises forming a mixture of rosin and 0.1% to 15%,--; and Column 6, line 56, cancel beginning with "which" to and including "15%".

SIGNED AND SEALED
NOV 24 1970

(SEAL)
Attest:

Edward M. Fletcher, Jr.
Attesting Officer

WILLIAM E. SCHUYLER, JR.
Commissioner of Patents